United States Patent [19]

Suetterlin et al.

[11] Patent Number: 4,513,118
[45] Date of Patent: Apr. 23, 1985

[54] EMULSION POLYMERS FOR MODIFYING IMPACT STRENGTH

[75] Inventors: Norbert Suetterlin, Ober-Ramstadt; Peter J. Arndt, Seeheim-Jugenheim; Ernst Heil, Stockstadt; Werner Siol, Darmstadt; Willi Tilch, Reinheim; Wilhelm Wopker, Bickenbach, all of Fed. Rep. of Germany

[73] Assignee: Röhm GmbH, Darmstadt, Fed. Rep. of Germany

[21] Appl. No.: 567,793

[22] Filed: Jan. 3, 1984

[30] Foreign Application Priority Data

Jan. 10, 1983 [DE] Fed. Rep. of Germany ....... 3300526

[51] Int. Cl.$^3$ .................. C08L 33/08; C08L 33/12
[52] U.S. Cl. ........................................ 525/81; 525/82; 525/304; 525/305
[58] Field of Search ................ 525/81, 82, 304, 305, 525/902

[56] References Cited

U.S. PATENT DOCUMENTS

| 3,222,423 | 12/1965 | Roebuck | 260/887 |
| 3,450,796 | 6/1969 | Griffin | 260/885 |
| 3,502,604 | 3/1970 | Nakatsuka et al. | 260/29.6 |
| 3,562,235 | 2/1971 | Ryan | 260/885 |
| 3,655,826 | 4/1972 | Fellmann et al. | 260/876 R |
| 3,657,172 | 4/1972 | Gallagher et al. | 260/29.6 RB |
| 3,661,994 | 5/1972 | Hwa et al. | 260/879 |
| 3,745,196 | 7/1973 | Lane et al. | 260/881 |
| 3,793,402 | 2/1974 | Owens | 260/876 R |
| 3,804,925 | 4/1974 | Kato et al. | 525/81 |
| 3,971,835 | 7/1976 | Myers et al. | 525/81 |
| 4,115,480 | 9/1978 | Kinoshita et al. | 260/885 |
| 4,397,992 | 8/1983 | Johansson et al. | 525/304 |

FOREIGN PATENT DOCUMENTS 46340 2/1982 European Pat. Off. .
2917321 11/1980 Fed. Rep. of Germany .

Primary Examiner—Carman J. Seccuro
Attorney, Agent, or Firm—Curtis, Morris & Safford

[57] ABSTRACT

An emulsion polymer comprising a hard nonelastomeric core, an elastomeric intermediate stage produced in the presence of the core and essentially composed of an acrylic ester and a crosslinking monomer which contains three or more acrylic or methacrylic groups in the molecule, and a hard nonelastomeric final stage produced in the presence of the elastomeric intermediate stage and crosslinked therewith, said polymer being useful as an impact strength modifying agent which, in admixture with a thermoplastic polymethyl methacrylate molding compound for example, yields molded articles exhibiting reduced susceptibility to stress whitening and improved impact strength.

4 Claims, No Drawings

EMULSION POLYMERS FOR MODIFYING IMPACT STRENGTH

The present invention relates to multistage emulsion polymers which are intended primarily for admixture with hard and relatively brittle synthetic resins for the purpose of improving the strength characteristics of the resin.

Such polymers are frequently referred to as impact strength modifying agents, although they can also be used alone as molding compounds in the manufacture of impact resistant molded articles, sheets, and the like.

The basic structure of the polymers comprises a hard, nonelastomeric core, an elastomeric intermediate stage, and a hard, nonelastomeric final stage. It is hypothesized that the polymers of the intermediate stage and of the final stage are disposed about the core in the manner of a shell.

A great many impact strength modifiers produced by emulsion polymerization and comprising an elastomeric core and a hard, nonelastomeric shell are known from the prior art.

According to U.S. Pat. No. 3,661,994, an improvement over these emulsion polymers is achieved by producing a hard core as the first stage of the emulsion polymer and, in two successive polymerization stages, an elastomeric coating and a hard coating are created. The elastomeric coating is crosslinked with divinyl monomers such as divinylbenzene or butylene dimethacrylate.

According to U.S. Pat. No. 3,793,402, a further improvement over such emulsion polymers is obtained by the use of two different crosslinking agents in the elastomeric phase. One of these two types of crosslinking agent is called a "polymerization crosslinker" and contains two or more polymerizable double bonds which have the same rate of polymerization as the monounsaturated primary monomer that forms the major portion of the elastomeric phase. It produces internal crosslinking of the elastomeric phase and is completely consumed by the time the polymerization of the elastomeric stage is completed. Diacryl esters and dimethacryl esters of diols, and divinylbenzene and trivinylbenzene are named as examples.

The second type of crosslinking agent, which must be used concurrently, is called a "graft crosslinker". It contains a polymerizable double bond whose rate of polymerization is the same as that of the primary monomer and a further polymerizable double bond whose rate of polymerization is markedly slower. The last mentioned double bonds remain at least partially unchanged when the primary monomer is completely polymerized and are gradually consumed as polymerization continues in the third stage. Thus, they produce a crosslinking of the elastomeric second stage with the hard third stage.

This double crosslinking has proved essential to prevention of so called "stress whitening". By this is meant a permanent local white coloration of an otherwise transparent molded article at points where it has been subjected to pronounced stretching or impact. Stress whitening is attributed to the formation of cracks or to detachment between the continuous hard phase of the molded article and the elastomeric phase embedded therein in finely dispersed form. This interpretation seems to be borne out by the fact that detachment of the two phases, and hence the troublesome stress whitening under tensile stress, are prevented by the crosslinking of the elastomeric phase with the hard phase. However, when the amount of the graft crosslinker is increased to the point where stress whitening is completely absent, a reduction in strength, and particularly in impact strength, is observed.

The object of the present invention is largely or completely to prevent stress whitening in three stage emulsion polymers or in molding compounds produced therefrom by admixture with other synthetic resins, without reducing their impact strength.

It has been found that in such three stage emulsion polymers this object is accomplished by including in the composition of the elastomeric intermediate stage, as polyfunctional monomers, at least 0.2 weight percent, based on the monomers making up the elastomeric phase, of monomers having three or more acrylic and/or methacrylic groups.

On the basis of the classification known from the prior art, these monomers belong to the class of polymerization crosslinking agents since they contain the same unsaturated polymerizable groups as the primary monomers of the elastomeric phase, namely, acrylic or methacrylic groups of the structure

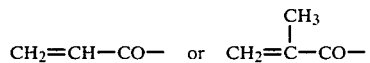

In accordance with the invention, however, no graft crosslinkers are used, and the strength reduction which they would entail therefore does not occur. Surprisingly, despite the absence of graft crosslinking agents the emulsion polymers of the invention exhibit no stress whitening when subjected to impact or tensile loads.

It is known from European patent application No. 46340 to incorporate, as crosslinking agents in an impact strength modifier consisting of a three stage emulsion polymer of the type described which need not contain graft crosslinkers in the elastomeric phase, "compounds having at least two nonconjugated C═C bonds". This may be regarded as a reference to crosslinking agents having three or more unsaturated moieties. However, these are compounds such as triallyl cyanurate or triallyl isocyanurate which do not contain three or more acrylic or methacrylic groups. However, while the latter do have the effect in accordance with the invention, triallyl cyanurate does not.

The polyfunctional crosslinking agents which in accordance with the invention are included in the composition of the elastomeric phase contain at least three, and usually not more than four, acrylic or methacrylic groups bound to a polyfunctional organic moiety. Crosslinking agents having up to six or even more such groups may be used. The acrylic or methacrylic groups are preferably bound to the organic moiety as esters through oxygen atoms of the organic moiety. Amide-like bonding through nitrogen atoms is also possible. All unsaturated moieties of the crosslinking agent molecule are preferably derived from acrylic acid alone or from methacrylic acid alone and are all linked either solely in ester fashion or solely in amide fashion. The polyfunctional organic moiety is preferably an alcohol or amine of an aliphatic hydrocarbon and contains from 2 to 12 carbon atoms. Thus, it may be derived from glycerol, trimethylolpropane, pentaerythritol, inositol, or similar sugar alcohols for example, or from ethylenediamine or other aliphatic diamines or polyamines having up to 12 carbon atoms. Triacrylamide and trimethacrylamide are also suitable for use as crosslinking agents.

Thus, the polyfunctional crosslinkers of the invention can be defined as having the structure

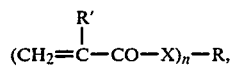

wherein R is an aliphatic group having 2 to 12 carbon atoms (preferably 3 to 12 carbon atoms, and particularly 3 to 6 carbon atoms) and from 0 to 6 oxygen atoms. R may be cyclic or acyclic and is preferably an aliphatic hydrocarbon, particularly a saturated aliphatic hydrocarbon. In the formula, X is —NH or, preferably, oxygen. R' is hydrogen or methyl. n is an integer from 3 to 6, or, in the case of mixtures, has an average value between 3 and 6 which may not be integral.

A content of less than 0.2 weight percent of the tri- or poly-functional crosslinking agent will not permit the desired effect to be obtained. With contents of over 3 weight percent, the impact strength will again decrease. Thus, the preferred range is 0.5 to 3 weight percent, and more particularly 0.8 to 2.6 weight percent, based on the weight of the monomers making up the elastomeric phase.

In addition to the tri- or poly-functional crosslinking agent, further crosslinking agents having two acrylic or methacrylic groups, for example, ethylene glycol diacrylate or dimethacrylate, or methylenebis acrylamide or methacrylamide, may also be used, although this is not required.

In other respects, the composition of the multistage emulsion polymer largely corresponds to the prior art cited.

For example, the amount of the hard, nonelastomeric core may be between 6 and 40 percent, and more particularly between 20 and 30 percent, of the total weight of the multistage emulsion polymer. The core diameter usually ranges from 100 to 500 nm and preferably is about 200 nm. The core is prepared conventionally in an aqueous medium by emulsion polymerization of a monomeric material consisting of at least 80 weight percent of methyl methacrylate or styrene or a mixture thereof. Methyl methacrylate preferably predominates in such mixtures. Comonomers, which may amount to as much as 20 weight percent of the monomer material, include other alkyl esters of methacrylic acid, alkyl esters of acrylic acid, acrylonitrile, vinyltoluene, and vinyl halides, for example. The monomeric material may further contain comonomers having at least two polymerizable double bonds in an amount of up to 5 weight percent. To improve the stability of the dispersion, small amounts of acidic comonomers such as acrylic acid or methacrylic acid, or esters or amides of acrylic or methacrylic acid which contain sulfonic or phosphonic acid groups, may also be used.

The glass transition temperature (as determined in conformity with DIN 7742) of the core material should be over 50° C. and preferably ranges from 80° C. to 150° C.

The elastomeric phase or intermediate stage has a glass transition temperature below 0° C. and is prepared by emulsion polymerization in an aqueous medium in the presence of the core latex. The elastomeric phase accounts for 20 to 70 percent by weight of the multistage emulsion polymer. Whether the intermediate shage passes gradually or in several steps into the final stage, the intermediate stage is deemed to include all polymer components formed during the emulsion polymerization which have a glass transition temperature under 0° C. The glass transition temperature of these components often cannot be determined individually. However, it can be determined by preparing an emulsion polymer with the respective monomer composition per se, without a core latex, isolating it, and determining its glass transition temperature (in conformity with DIN 7742).

The elastomeric intermediate stage comprises at least 90 percent by weight, and preferably at least 96 percent by weight, of monofunctional ethylenically unsaturated comonomers. These are deemed to include all monomers having only one polymerizable group, such as a vinyl, vinylidene, or ethylidene group, which can be polymerized or copolymerized with free radical initiators. At least 50 percent, and preferably from 60 to 90 percent by weight of these monomers, consist of alkyl esters of acrylic acid having from 1 to 18 carbon atoms, and more particularly from 2 to 10 carbon atoms, or of alkyl esters of methacrylic acid having from 4 to 18 carbon atoms, and more particularly from 4 to 12 carbon atoms, in the alkyl group.

Suitable comonomers are, for example, styrene, alpha-methylstyrene, vinyltoluene, vinylcarbazole, vinyl acetate, vinyl propionate, and vinyl esters of other fatty acids having from 4 to 20 carbon atoms, acrylonitrile or methacrylonitrile, alkyl esters of maleic, fumaric or itaconic acid, olefins, etc. As a rule, strongly polar monomers, such as acrylic or methacrylic acid or their amides or hydroxyalkyl esters or aminoalkyl esters, are not used, or then only in small amounts. The total amount of the comonomers should be limited so that a glass transition temperature of 0° C. is not exceeded for the intermediate stage.

Of special importance as comonomers are aromatic vinyl monomers, and particularly styrene, since they increase the refractive index of the elastomeric phase and permit it to be matched to that of the other polymer phases and of the thermoplastic polymer which optionally is used as a component. Depending on their refractive index, from 10 to 40 weight percent of aromatic vinyls, and particularly styrene, may be incorporated in the elastomeric intermediate stage. Styrene contents ranging from 13 to 17 percent, based on the weight of the elastomeric intermediate stage, are particularly preferred.

Like the preceding stage, the hard, nonelastomeric final stage is produced by emulsion polymerization in an aqueous medium in the presence of the preceding stage. It is hypothesized that the intermediate and final phases coat the core in the order of the polymerization stages in the manner of a shell, with the final stage forming the outermost envelope of the emulsion polymer particles. The final stage normally represents from 15 to 60 percent, and preferably from 20 to 40 percent, of the total weight of the multistage emulsion polymer.

Methyl methacrylate accounts for at least 80 weight percent, and preferably for at least 90 weight percent, of the monomeric material of the final stage. It is highly preferred that only methyl methacrylate be used. The monofunctional monomers recited as possible constituents of the intermediate stage are suitable for possible use as comonomers. They should be so selected, with regard to kind and amount, that the glass transition temperature (in conformity with DIN 7742) is not below 50° C.

When the emulsion polymer is to be used in admixture with a thermoplastic molding compound, and in particular with a polymethyl methacrylate molding compound, it will be advantageous to match the molecular weight of the final stage polymer, to the extent that it is not crosslinked with the hard phase by grafting, to that of the molding compound. To this end, a regulator may be used in the polymerization of the final stage, for example from 0.05 to 2 percent (based on the weight of the final stage) of a monovalent aliphatic mercaptan such as dodecyl mercaptan.

It is essential that the core, the intermediate stage, and the final stage be produced in that order by successive stages of an emulsion polymerization process in an aqueous medium. Until the final stage is completed, the latex particles remain emulsified. If desired, the stages mentioned may be divided into partial stages in which slightly different conditions may prevail, for example the compositions of the monomeric material may vary.

Moreover, further intermediate stages may be included which cannot be definitely assigned by any one of said stages. For example, an emulsion polymer having a glass transition temperature between 0° C. and 50° C. may be produced between the elastomeric intermediate stage and the final stage as a further intermediate stage. In this case, it will be advantageous to use at least 0.2 weight percent of crosslinking monomers having three or more acrylic and/or methacrylic groups in this additional polymerization stage as well as in the elastomeric intermediate stage. This is true also in case the composition of the intermediate stage is continuously varied in such a way that the glass transition temperature of the particular polymer formed gradually rises from below 0° C. up to 50° C.

The emulsion polymerization is carried out conventionally by the seed latex method. The aqueous medium contains a preferably anionic emulsifier and either a water soluble or a water insoluble initiator. The monomeric material for formation of the core latex (seed latex) may be emulsified in the aqueous medium before the polymerization conditions are established or added continuously or in portions under the conditions of polymerization. Similarly, a portion of the monomeric material may be added before, and the remaining portion after, polymerization conditions are established. The particle size of the core latex is essentially determined in the initial phase of polymerization.

When ammonium or alkali metal persulfates are used as initiators, the polymerization temperature will range from 50° C. to 100° C. With redox initiator systems, it may be lower.

The monomeric materials of the elastomeric intermediate stage and of the final stage, and of any further intermediate stages, may be added batchwise or gradually when polymerization of the preceding stage is largely or fully completed. During these process stages, more initiator and/or emulsifier may be metered in. However, the total amount of emulsifiers should be kept as low as possible since they may be detrimental to the end product. As a rule, about 0.01 to 5 weight percent of emulsifiers, based on the total weight of the polymer, should be used.

The emulsion polymer is isolated from the latex obtained by conventional methods, for example by spray drying or freeze drying, or by coagulation, filtration, and drying. The polymer will then be obtained in free flowing dry form, provided that during the isolation conditions are avoided under which the polymer would excessively agglomerate by sintering. Another method for separating a polymer from a latex is known from published German patent application DOS No. 29 17 321. It is based on the coagulation and dewatering of the latex in a screw extruder from which a molten strand of the polymer is discharged.

The new multistage emulsion polymers can be processed thermoplastically at temperatures ranging from 150° C. to 300° C., and preferably from 200° C. to 280° C., by extrusion, calendering, injection molding, etc., into impact resistant hard molded articles or sheets.

However, they are preferably processed in admixture with other thermoplastic synthetic resins with which they are homogeneously miscible into molding compositions that will considerably increase the impact strength of said resins. These molding compositions can also be processed by the methods recited.

Thus the impact strength modifying agents of the invention may be mixed for example, with polyvinyl chloride containing no plasticizer or little plasticizer, since such polymers are fully compatible and homogenously miscible with the material of the final stage of the polymer in accordance with the invention. In this case, the impact strength modifying agent is generally used in an amount representing from 10 to 80 percent by weight of the molding composition.

The preferred field of use of the new impact strength modifying agent is its admixture with molding compounds comprising methyl methacrylate. This may be pure polymethyl methacrylate or copolymers comprising from 50 to 99 weight percent methyl methacrylate and from 1 to 50 weight percent of at least one other monofunctional ethylenically unsaturated comonomer, for example alkyl esters of acrylic acid having from 1 to 8 carbon atoms in the alkyl group, or alkyl esters of methacrylic acid having 2 to 10 carbon atoms in the alkyl group. In these molding compounds, the amount of impact strength modifying agent is about 10 to 80 percent by weight. The molding compounds are distinguished by good strength properties. The notched-bar impact strength determined in conformity with DIN 53 448 ranges from 4 to 7 N/mm$^2$, for example. No stress whitening will occur with impact loads of up to 30 in.lb.

The preparation of the emulsion polymers of the invention is described in following Examples 1 to 18. For comparison, Examples 19 to 23 relate to the preparation of emulsion polymers other than in accordance with the teaching of the present invention. Applications testing of the emulsion polymers shows that the crosslinking principle in accordance with the invention is of crucial importance to the production of emulsion polymers having the desired properties.

In the following Examples, part are parts by weight and percentages are percentages by weight.

EXAMPLES (A) Preparation of seed latices as core material

EXAMPLE 1

450 parts of methyl methacrylate were conventionally polymerized by the emulsion addition method with a water phase of 1150 parts of water in a stirred vessel. 3 parts of potassium persulfate were used as an initiator and 0.9 part of sodium lauryl sulfate as an emulsifier. (Batch 1a). In another batch (1b), 1.6 parts of potassium persulfate, 2.4 parts of sodium dithionate, and 0.001 part of ferrous sulfate were used as a redox initiator and the polymerization was carried out by emulsifying and heating the entire batch. In further batches corresponding to (1a) and (1b), 0.9 part or 2 parts, respectively, of $C_{15}$ paraffin sulfonate, or 1.5 or 5 parts, respectively, of a five-fold hydroxyethylated and phosphated isononyl phenol (sodium salt) were used in place of the sodium lauryl sulfate.

In all cases, seed latices having a solids content of 28 percent were obtained.

EXAMPLE 2

In the procedure of Example 1a, a mixture of methyl methacrylate and 0.5% of either allyl methacrylate, trimethylolpropane triacrylate, or 1,4-butanediol dimethacrylate was used in place of methyl methacrylate.

EXAMPLE 3

(3a) 99 parts of methyl methacrylate, 0.9 part of 1,4-butanediol diacrylate and 0.1 part of methacrylic acid; and (3b) 84 parts of methyl methacrylate, 12 parts of styrene, 3.9 parts of isobutyl methacrylate and 0.1 part of methacrylic acid were polymerized by the procedure of Example 1a.

The emulsion polymers of Examples 1 to 3 had glass transition temperatures between 100° C. and 130° C.

(B) Preparation of emulsion polymers in accordance with the invention

EXAMPLE 4

250 parts of the seed latex of Example 2 were charged into an agitator and a mixture of
  91.4 parts of butyl acrylate,
  17.9 parts of styrene,
  6.8 parts of methyl methacrylate,
  1.2 parts of trimethylolpropane trimethacrylate,
  82 parts of water,
  0.9 part of sodium lauryl sulfate, and
  0.048 part of potassium persulfate
was thermally polymerized onto it as an elastomeric intermediate stage.

A mixture of
  80 parts of methyl methacrylate,
  26.5 parts of water,
  0.06 part of sodium lauryl sulfate,
  0.045 part of potassium persulfate, and
  0.15 part of 2-ethylhexyl thioglycolate
was then thermally grafted thereon as a nonelastomeric final stage.

A latex with a solids content of about 44% was so obtained. From it, the emulsion polymer was isolated by spray drying.

In a further batch, a redox system of 0.09 part of 1,4-diisopropylbenzene hydroperoxide, 0.06 part of sodium hydroxymethyl sulfate, and 0.001 part of ferrous sulfate was used as an initiator for the intermediate stage in place of the persulfate. For the final stage, another 0.08 part each of said components, but no further ferrous sulfate, was added.

Seed latices according to Examples 1 and 3 were used with equally good results. In place of the sodium lauryl sulfate, the same amount of a $C_{15}$ paraffin sulfonate or double the amount of a five-fold hydroxyethylated and phosphated isononyl phenol (sodium salt) was used as an emulsifier.

EXAMPLE 5

Example 4 was repeated, except that in place of 250 parts of the seed latex of Example 2 only 125 parts were used.

EXAMPLE 6

Example 4 was repeated with an increased amount of crosslinking agent. The monomeric charge of the intermediate stage consisted of:
  91.4 parts of butyl acrylate,
  16.4 parts of styrene,
  6.5 parts of methyl methacrylate, and
  3.0 parts of trimethylolpropane triacrylate.

EXAMPLES 7 TO 11

Example 4 was repeated with varying amounts of other crosslinking agents in the intermediate stage, namely:
  Example 7: 1.5 parts of trimethylolpropane trimethacrylate
  Example 8: 2.3 parts of trimethylolpropane trimethacrylate
  Example 9: 1.5 parts of pentaerythritol triacrylate
  Example 10: 1.5 parts of pentaerythritol tetraacrylate
  Example 11: 1.5 parts of pentaerythritol tetramethacrylate
  Example 12: 1.2 parts of dipentaerythritol hexamethacrylate $[(CH_2\!=\!CCH_3CO_2)_6C_{10}H_{16}O]$
  Example 13: 1.2 parts of dimethylolpropane tetraacrylate $[(CH_2\!=\!CHCO_2)_4C_{12}H_{22}O]$
  Example 14: 1.5 parts of trimethylolethane trimethacrylate $[(CH_2\!=\!CCH_3CO_2)_3C_5H_9]$
  Example 15: 1.2 parts of an equimolar mixture of sorbitol pentaacrylate and sorbitol hexaacrylate $[(CH_2\!=\!CHCO_2)_mC_6H_{14-m}O_{6-m}$, where $m=5.5]$
  Example 16: 1.2 parts of tetramethacrylamido n-pentane $[(CH_2\!=\!CCH_3CO_2)_4C_5H_8]$ $C_{15}$ paraffin sulfonate was used as emulsifier in each case.

EXAMPLE 17

Example 4 was repeated with the following monomer composition in the intermediate stage:
  98.2 parts of butyl acrylate,
  18.9 parts of styrene,
  1.4 parts of trimethylolpropane triacrylate, and
  0.1 part of methacrylic acid.

EXAMPLE 18

Example 4 was repeated with the following monomer composition in the intermediate stage:
  71.4 parts of butyl acrylate,
  20 parts of 2-ethylhexyl acrylate,
  18.2 parts of styrene,
  6.8 parts of methyl methacrylate, and
  1.5 parts of trimethylolpropane trimethacrylate.

(C) Preparation of comparative latices

The following comparative Examples were carried out like Example 4 using a $C_{14}$ paraffin sulfonate as an emulsifier, except that the composition of the intermediate stage was varied as follows:

EXAMPLE 19

91.4 parts of butyl acrylate,
  16.4 parts of styrene,
  6.0 parts of methyl methacrylate, 2.3 parts of trimethylolpropane triacrylate, and
1.2 parts of allyl methacrylate.

EXAMPLE 20

91.4 parts of butyl acrylate
16.4 parts of styrene,
4.9 parts of methyl methacrylate,
2.3 parts of trimethylolpropane triacrylate, and
2.3 parts of allyl methacrylate.

EXAMPLE 21

91.4 parts of butyl acrylate
17.6 parts of styrene,
6.8 parts of methyl methacrylate, and
1.5 parts of 1,4-butanediol dimethacrylate.

EXAMPLE 22

91.4 parts of butyl acrylate
17.6 parts of styrene,
5.3 parts of methyl methacrylate, and
3.0 parts of triallyl cyanurate.

EXAMPLE 23

91.4 parts of butyl acrylate
17.5 parts of styrene,
5.3 parts of methyl methacrylate,
1.9 parts of triallyl cyanurate, and
1.2 parts of 1,4-butanediol dimethacrylate.

(D) Applications testing of emulsion polymers

The spray dried emulsion polymers of Examples 4–11 and 17–23 were homogeneously mixed with a thermoplastically processable polymethyl methacrylate molding compound by means of an extruder. The mixing ratio was chosen such that the amount of the acrylic acid alkyl esters contained in the intermediate stage represented 20% of the mixture. From this mixture, small plates 3 mm thick were produced by injection molding and then tested for stress whitening and impact strength by the Gardner test. Impact strength was evaluated on the basis of the lowest impact energy which resulted in damage to the specimen. Stress whitening was judged visually and rated as follows:

| Emulsion polymer according to Example | Stress whitening | Impact energy resulting in damage (in · lb) |
|---|---|---|
| 4 | 1 | greater than 40 |
| 5 | 1 | greater than 40 |
| 6 | 0 | greater than 40 |
| 7 | 0 | greater than 40 |
| 8 | 0 | greater than 40 |
| 9 | 1 | greater than 40 |
| 10 | 0 | greater than 40 |
| 11 | 0 | greater than 40 |
| 17 | 1 | greater than 40 |
| 18 | 1 | greater than 40 |
| Comparative tests: | | |
| 19 | 1 | 20 |
| 20 | 0 | 12 |
| 21 | 3 | greater than 40 |
| 22 | 2 | greater than 40 |

-continued

| Emulsion polymer according to Example | Stress whitening | Impact energy resulting in damage (in · lb) |
|---|---|---|
| 23 | 1 | 16 |

0 - No stress whitening
1 - Barely visible stress whitening
2 - Minor stress whitening
3 - Pronounced stress whitening The emulsion polymers of Examples 12–16 were isolated by spray drying and mixed with about an equal amount of a conventional polymethyl methacrylate forming mass. On testing thereof for stress whitening, samples were visually evaluated as 0–1. Impact energy greater than 30 in.lb was required to cause damage.

What is claimed is:

1. A multistage emulsion polymer adaptable to inclusion in a transparent methyl methacrylate thermoplastic molding compound to improve the impact strength thereof without loss of transparency and without stress whitening, said polymer comprising
   (a) a hard, nonelastomeric core polymer having a glass transition temperature above 50° C., produced by the emulsion polymerization of a monomer component consisting of at least 80 percent by weight of methyl methacrylate and up to 20 percent by weight of at least one other, different, ethylenically unsaturated monomer copolymerizable therewith;
   (b) an elastomeric intermediate polymer having a glass transition temperature below 0° C., produced by the emulsion polymerization, in the presence of the hard core polymer (a), of a monomer mixture consisting of (i) at least 90 percent by weight of at least one monoethylenically unsaturated monomer of which at least 50 percent by weight is at least one alkyl ester of acrylic acid having from 1 to 18 carbon atoms in the alkyl group or at least one alkyl ester of methacrylic acid having from 4 to 18 carbon atoms in the alkyl group, (ii) 0.2 to 3 percent, by weight of the mixture of stage (b), of at least one polyfunctional monomer having three or more acrylic or methacrylic groups, and (iii) the balance being at least one further monoethylenically unsaturated monomer such that the refraction index of polymer (b) matches that of polymethyl methacrylate; and
   (c) a hard, nonelastomeric final polymer having a glass transition temperature above 50° C., produced by the emulsion polymerization, in the presence of the elastomeric polymer (b), of a monomer component consisting of at least 80 percent by weight of methyl methacrylate and up to 20 weight percent of at least one other monoethylenically unsaturated monomer copolymerizable therewith.

2. An emulsion polymer as in claim 1 wherein said polyfunctional monomer (b) (ii) is used in an amount from 0.8 to 2.6 percent by weight.

3. An emulsion polymer as in claim 1 wherein said polyfunctional monomer (b) (ii) has the formula

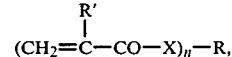

wherein R is aliphatic having 2 to 12 carbon atoms, R' is hydrogen or methyl, X is —NH or —O—, and n has a value from 3 to 6.

4. A molding composition comprising from 10 to 80 percent by weight of the emulsion polymer of claim 1 and from 90 to 20 percent by weight of a thermoplastic molding compound comprising methyl methacrylate.

* * * * *